United States Patent Office 3,321,462
Patented May 23, 1967

3,321,462
PROCESS FOR THE PREPARATION OF
NUCLEOSIDE POLYPHOSPHATES
John G. Moffatt, Palo Alto, Calif., assignor to Syntex Corporation, Panama, Panama, a corporation of Panama
No Drawing. Filed July 15, 1963, Ser. No. 295,181
13 Claims. (Cl. 260—211.5)

This invention relates to a novel method of synthesizing nucleoside-5'-polyphosphates. More particularly this invention relates to a novel method of producing, in high yields, nucleoside-5'-polyphosphates, and especially nucleoside-5'-diphosphates, -triphosphates, -tetraphosphates and -pentaphosphates, which show little or no tendency to subsequently degrade to the corresponding lower phosphates.

Recent progress in biochemical research has indicated the unique importance of nucleoside-5'-polyphosphates, and particularly ribonucleoside - 5' - di-and-triphosphates and deoxyribonucleoside-5'-di-and-triphosphates, in biological systems. In particular, the role played by adenosine-5'-triphosphate (ATP) as the primary energy source in many biological systems is well known at the present time. However, nucleoside-5'-di-and-triphosphates in general are essential active intermediates in cellular metabolism. They are the active forms in which nucleosides and nucleoside analogs are incorporated into cellular nucleic acids, and thus serve as direct precursors of both ribonucleic and desoxyribonucleic acids, as well as of nucleotide coenzymes. Furthermore, various nucleoside-5'-triphosphates also act as specific co-factors for certain biological transformations, e.g., guanosine-5'-triphosphate is required in protein synthesis.

This multiplicity of functions performed by nucleoside-5'-polyphosphates, together with the desire to further study their roles in various biological systems, has led to a considerable demand for more efficient synthetic methods for their preparation.

One of the best general methods of synthesizing nucleoside-5'-polyphosphates known to the art at the present time involves first refluxing a solution of a nucleoside-5'-monophosphate, e.g., adenosine-5'-phosphate, with about 5 equivalents of a carbodiimide, preferably dicyclohexylcarbodiimide, and about 5 equivalents of an amine such as cyclohexylamine, piperidine, or morpholine, preferably the latter, in 67% aqueous t-butanol. The resulting nucleoside-5'-phosphoramidate carboxamidinium salt, e.g. adenosine-5'-phosphoromorpholidate 4-morpholine N,N'-dicyclohexylcarboxamidinium salt, is then reacted, in anhydrous pyridine, with about a ten-fold excess of a trialkylammonium salt, e.g., the tri-n-butyl-ammonium salt, of the desired inorganic polyphosphate, e.g., orthophosphate, pyrophosphate, tripolyphosphate, tetrapolyphosphate, and the like, to give the desired nucleoside-5'-polyphosphate, e.g. adenosine-5'-diphosphate, -triphosphate, -tetraphosphate, -pentaphosphate, and the like.

However, despite the general applicability of this method, it has been found to have several undesirable features. First of all, yields of the desired higher polyphosphates are only moderate. For example, in the case of the reaction between adenosine-5'-phosphoromorpholidate 4-morpholine N,N'-dicyclohexylcarboxamidinium salt and bis-tri-n-butyl-ammonium pyrophosphate in anhydrous pyridine, a yield of only 57% of adenosine-5'-triphosphate was obtained after 2 hours reaction at 25° C. Secondly, and perhaps more important, it has been observed that the desired polyphosphates initially obtained by means of this general method have a marked tendency to degrade during the reaction to the corresponding lower phosphates. Thus, again in the case of the reaction of adenosine-5'-phosphoromorpholidate 4-morpholine N,N'-dicyclohexylcarboxamidinium salt and bis-tri-n-butylammonium pyrophosphate in anhydrous pyridine, further reaction beyond the initial 2 hour reaction period in an attempt to increase the yield of adenosine-5'-triphosphate instead caused adenosine-5'-triphosphate to be largely converted to adenosine-5'-diphosphate, which was found to be present in 76% yield after 24 hours reaction at 25° C. Furthermore, it has been found that this phenomenon is quite general, with the rate of disappearance of the initially formed polyphosphate being a function of the particular nucleotide under consideration. Thus, it is apparent that any modification of the above-described general method which would permit the preparation, in high yields, of nucleoside-5'-polyphosphates which would show little or no tendency to subsequently degrade during the reaction to the corresponding lower phosphates would be of great benefit to the art.

The present invention provides such a modification. More particularly, it has been discovered that if the above-described general method is modified by replacing the pyridine solvent with a substantially anhydrous hydrocarbon sulfoxide, such as dimethylsulfoxide, diethylsulfoxide, tetramethylenesulfoxide, and the like, which is a solvent for the reactants at the temperature at which the reaction is carried out, high yields of nucleoside-5'-polyphosphates which show little or no tendency to subsequently degrade are obtained.

It is, therefore, an object of this invention to provide a novel method of synthesizing nucleoside-5'-polyphosphates.

A further object of this invention is to provide a novel method of producing, in high yields, nucleoside-5'-polyphosphates, and especially nucleoside-5'-diphosphates, -triphosphates, -tetraphosphates and -pentaphosphates, which show little or no tendency to subsequently degrade to the corresponding lower phosphates.

These and other objects of the present invention will be discussed in greater detail hereinbelow.

An illustrative but by no means exhaustive enumeration of nucleoside-5'-polyphosphates which can be prepared by the method of the present invention includes those compounds represented by the general formula:

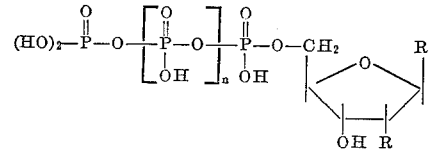

wherein R represents a substituted or unsubstituted purine of pyrimidine base, such as purine, pyrimidine, adenine, guanine, uracil, cytosine, thymine, 6-azauracil, 8-azaguanine, and the like; R' represents hydrogen, hydroxyl, amino, alkylamino, such as methylamino, ethylamino, dimethylamino, methyl ethylamino, and the like, thiol, alkylthio, e.g., methylthio and ethylthio, and the like, and $n$ represents an integer of from 0 to 3, inclusive, as well as the various salts thereof, e.g., the corresponding lithium, sodium, potassium, calcium and trialkylammonium, such as trimethyl- and triethylammonium, salts, and the like.

Included among the nucleoside -5'-polyphosphates represented by this general formula are such compounds as adenosine-5'-diphosphate, adenosine-5'-triphosphate, the lithium salt of adenosine-5'-triphosphate, adenosine-5'-tetraphosphate, adenosine-5'-pentaphosphate, deoxyadenosine-5'-diphosphate, deoxyadenosine-5'-triphosphate, the sodium salt of deoxyadenosine-5'-triphosphate, cytidine-5'-diphosphate, cytidine-5'-triphosphate, cytidine-5'-tetraphosphate, deoxycytidine-5'-triphosphate, the sodium salt of deoxycytidine-5'-triphosphate, guanosine-5'-triphosphate, guanosine-5'-tetraphosphate, the sodium salt of deoxyguanosine - 5'-triphosphate, thymidine - 5'-triphosphate, the potassium salt of thymidine-5'-triphosphate, thymidine-5'-pentaphosphate, uridine-5'-diphosphate, uridine-5'-triphosphate, 6-azauridine-5'-diphosphate, 6-azauridine-5'-triphosphate, 8-azaguanosine - 5'-triphosphate, and the like.

The starting materials used in preparing nucleoside-5'-polyphosphates by the method of the present invention are the corresponding nucleoside-5'-phosphoramidates, in the form of their carboxamidinium salts, e.g., the carboxamidinium salts of nucleoside-5'-phosphoramidates corresponding to the nucleoside-5'-polyphosphates represented by the above general formula.

Among the carbodiimides which can be used in preparing the nucleoside-5'-phosphoramidate carboxamidinium salts are N,N'-di(hydrocarbon substituted)carbodiimides, e.g., N,N'-dialkyl(including cycloalkyl) - carbodiimides such as N,N'-dimethylcarbodiimide, N,N'-di-n-propylcarbodiimide, N,N' - diisopropylcarbodiimide, N,N'-di-butyl-carbodiimide, N,N'-dicyclohexylcarbodiimide, N,N'-di(methylcyclohexyl)carbodiimide, and the like, N,N'-diarylcarbodiimides such as N,N'-di-p-tolylcarbodiimide, N,N'-di-m-xylylcarbodiimide, and the like, and N-alkyl-N'-aryl-carbodiimide such as N-(4-pyridylmethyl)-N'-cyclohexylcarbodiimide (which can be prepared by the condensation of cyclohexylisothiocyanate and 4-aminomethylpyridine followed by desulfurization with sodium hypochlorite or mercuric oxide), and the like.

In general, any aliphatic or aromatic amine, e.g., butylamine, octylamine, diethylamine, dipropylamine, cyclohexylamine, aniline, piperidine, pyrrolidine, morpholine, imidazole, and the like, can be used, together with a carbodiimide, in preparing the nucleoside-5'-phosphoramidate carboxamidinium salt.

The method employed in preparing the nucleoside-5'-phosphoramidate carboxamidinium salts is that described by Moffatt et al., in J. Am. Chem. Soc., 83 649(1961), and included among the compounds which can be prepared thereby are:

adenosine-5'-phosphoropiperidate 4-morpholine
   N,N'-dicyclohexylcarboxamidinium salt,
adenosine-5'-phosphoromorpholidate 4-morpholine
   N,N'-dicyclohexylcarboxamidinium salt,
adenosine-5'-phosphoropiperidate 1-piperidine
   N,N'-dicyclohexylcarboxamidinium salt,
deoxyadenosine-5'-phosphoromorpholidate
   4-morpholine N,N'-dicyclohexylcarboxamidinium salt,
cytidine-5'-phosphoropiperidate 1-piperidine
   N,N'-diisopropylcarboxamidinium salt,
cytidine-5'-phosphoromorpholidate 4-morpholine
   N,N'-dicyclohexylcarboxamidinium salt,
deoxycytidine-5'-phosphoropyrrolidate 1-pyrrolidine
   N,N'-di-p-tolylcarboxamidinium salt,
deoxycytidine-5'-phosphoromorpholidate 4-morpholine
   N,N-dicyclohexylcarboxamidinium salt,
guanosine-5'-phosphoropiperidate 4-morpholine
   N,N'-dibutylcarboxamidinium salt,
deoxyguanosine-5'-phosphoromorpholidate 4-morpholine
   N,N'-dicyclohexylcarboxamidinium salt,
thymidine-5'-phosphoromorpholidate 4-morpholine
   N,N'-dicyclohexylcarboxamidinium salt,
uridine-5'-phosphoropiperidate 1-piperidine
   N,N'-di(methylcyclohexyl)carboxamidinium salt,
6-azauridine-5'-phosphoromorpholidate 4-morpholine
   N,N'-dicyclohexylcarboxamidinium salt,
8-azaguanosine-5'-phosphoromorpholidate 4-morpholine
   N,N'-dicyclohexylcarboxamidinium salt, and the like.

The hydrocarbon sulfoxide employed as the solvent in the novel method of the present invention must be substantially anhydrous, i.e., it should have as low a moisture content as can be practicably achieved. One relatively simple method of arriving at a low moisture content, e.g., a moisture content of from about 1 part to about 10 parts per million of water by weight, based on the total weight of the sulfoxide, and therefore, the method which is preferred in practicing the present invention, involves carefully drying the sulfoxide over a molecular sieve, such as Linde Type 4A or 10X (which are commercially available beads or pellets of alkali metal aluminosilicates), for from about 3 days to about 7 days at a temperature of from about 20° C. to about 30° C. Of course, variations in the above-stated temperatures and times, as well as entirely different drying methods, can be employed, if desired, to render the sulfoxide substantially anhydrous.

The inorganic phosphate which is reacted with the nucleoside-5'-phosphoramidate carboxamidinium salt is one which contains one or more, e.g., from 1 to 4, phosphoryl groups, i.e.,

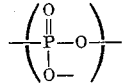

Thus, the inorganic phosphate can be an orthophosphate, pyrophosphate, tripolyphosphate, tetrapolyphosphate, or the like, and it will be used in the form of a tertiary amine salt, preferably a trialkylammonium salt such as the tripropyl-, tri-n-butyl-, triamyl-, trihexyl- or trioctylammonium salt, and the like. The tertiary amine salt will preferably be formed prior to contacting the inorganic phosphate with the nucleoside-5'-phosphoramidate carboxamidinium salt. It can be formed simply by adding the desired tertiary amine to a salt of the inorganic phosphate with a relatively weak base, e.g., pyridine, thereby effecting an exchange.

The preferred reaction procedure, involves first separately rendering the nucleoside-5'-phosphoramidate carboxamidinium salt and the inorganic phosphate tertiary amine salt substantially anhydrous, i.e., removing substantially all water therefrom which is not chemically bound, bringing them each to a moisture content of not more than about 0.01% by weight, and preferably not more than about 0.005% by weight, based on the total weight of the reactant. This can be accomplished, for example by evaporating each of these reactants under vacuum several times with from about 100 to about 200 times its weight of anhydrous pyridine, until the desired moisture content has been attained. Next, the reactants are added to the dried hydrocarbon sulfoxide, e.g., dimethylsulfoxide, and reacted at a temperature of from about 10° C. to about 100° C., and preferably at a temperature of from about 25° C. to about 50° C. for from about 1 hour to about 6 days. From about 0.5 to about 10 molar equivalents, and preferably from about 3 to about 5 molar equivalents, of the inorganic phosphate will generally be employed per molar equivalent of the nucleoside-5'-phosphoramidate, while the amount of sulfoxide employed generally will be from about 3 to about 10 times the total weight of the reactants.

Isolation o fthe nucleoside-5'-polyphosphates from the reaction mixture in a water soluble, non-hygroscopic solid form is readily accomplished by first separating the products by means of ion exchange chromatography on a commercially available DEAE (diethylaminoethyl) cellulose column in the bicarbonate form, using a linear gradient of triethylammonium bicarbonate as eluant, next removing excess trialkylammonium bicarbonate by low temperature evaporation, preferably at about 1 mm. pressure using a rotatory type evaporator in which the condensing bulb is cooled with circulating aqueous glycol at −10 to −20° C., and finally adding an excess of an alkali metal or alkaline earth metal iodide, e.g., sodium iodide, in acetone to a concentrated solution of the resulting trialkylammonium salt of the nucleotide in methanol and recovering the resulting alkali or alkaline earth metal salt. The products directly obtained by this procedure are suitable for use as such in biochemical studies.

It is readily apparent from the foregoing description of the preferred method of carrying out the process of the present invention that the only critical factor is the use of substantially anhydrous reactants and solvent, and that reaction temperatures and times, amounts of reactants, the order of addition of the reactants, and the like, can be varied to a considerable extent.

In order that those skilled in the art may more fully understand the present invention, the following examples are set forth. These examples are given solely for the purpose of illustration, and should not be considered as expressing limitations unless so set forth in the appended claims. All parts and percentages are by weight, unless otherwise stated.

Example I

A 1 mmole (millimole) portion of reagent grade tetrasodium pyrophosphate .10 $H_2O$, dissolved in 10 mls. of water, was passed through a column containing Dowex 50–W ion exchange resin (sulfonated polystyrene beads; 80% cross-linked) in the pyridine form. The resin was then washed with 30 ml. of water and the total effluent evaporated under vacuum (at about 1 mm. pressure using a rotatory type evaporator) to a volume of about 10 ml. Thirty ml. of pyridine were then added followed by 4.2 mmoles of tri-n-butylamine. The resulting homogeneous solution was evaporated to a syrup, and then rendered substantially anhydrous by four successive evaporations under vacuum with 10 ml. portions of pyridine which had previously been dried by distillation from, and storage over, calcium hydride. The residual pyridine was then removed from the anhydrous syrup by two evaporations with 5 ml. portions of benzene which had previously been dried using calcium hydride.

A 0.25 mmole portion of the 4-morpholine-N,N'-dicyclohexylcarboxamidinium salt of deoxyadenosine-5'-phosphormorpholidate, prepared, as were all the other nucleoside-5'-phosphoramidate carboxamidinium salts used in these examples, by the method of Moffatt et al. loc. cit., was rendered substantially anhydrous by two evaporations, under vacuum with 5 ml. portions of pyridine followed by two evaporations under vacuum of the residue with 5 ml. portions of benzene.

Dimethylsulfoxide was rendered substantially anhydrous by distillation from, and storage for 4 days at room temperature (about 25° C.) over Linde Molecular Sieve Type 10X.

The pyrophosphate was then dissolved in four separate 1 ml. portions of the dimethylsulfoxide, which were then added successively to the phosphoromorpholidate. The resulting clear solution was kept at room temperature for 4 days, with the disappearance of the phosphoromorpholidate being readily followed by descending paper chromatography on Scheicher and Schuell No. 589 Orange Ribbon paper, using a 6:3:1 mixture of n-propanol: ammonium hydroxide: water as the solvent and localizing the compounds by examination under ultraviolet light.

Following this reaction period, 30 ml. of water were added to the reaction mixture and the resulting solution was then directly applied to a 2 cm. x 30 cm. column of DEAE cellulose in the bicarbonate form. The column was then washed with water until the optical density of the effluent fell to zero, and the components were then eluted using a linear gradient of triethylammonium bicarbonate, with the mixing vessel containing 1500 ml. of water and the reservoir containing 1500 ml. of 0.35 M triethylammonium bicarbonate.

Ultraviolet examination of the eluate showed four clearly separated ultraviolet absorbing peaks, and the recovery of optical density was quantitative. The product distributions, together with those of the products of Examples II–VI, are shown in Table I below.

The pooled triphosphate peak was evaporated to dryness, at a water bath temperature of 30–35° C., and all residual triethylammonium bicarbonate was removed by four evaporations with 25 ml. portions of methanol.

The resulting residue was then dissolved in approximately 5 ml. of methanol and a 1 N solution of sodium iodide in acetone (6 equivalents relative to the deoxyadenosine-5'-triphosphate by spectra) was added, followed by 75 ml. of acetone. The precipitate was collected by centrifugation, washed three times with 30 ml. portions of acetone, and dried overnight under vacuum at room temperature over phosphorus pentoxide. The resulting sodium salt of deoxyadenosine-5'-triphosphate was recovered as a white, freely water soluble, non-hygroscopic powder which was chromatographically homogeneous in both a 60:100:1.6 mixture of isobutyric acid: 1 N ammonium hydroxide: 0.1 N tetrasodium ethylenediamine tetraacetic acid and a 6:3:1 mixture of n-propanol: ammonium hydroxide: water, and which evidenced the expected ratio of phosphorus: deoxyadenosine of 3:1, respectively.

Examples II–VI

The procedure employed in Example I was repeated in every detail in each of these examples except for the following. The 4-morpholine N,N'-dicyclohexylcarboxamidinium salt of deoxyadenosine-5'-phosphoromorpholidate was replaced by equivalent amounts of the 4-morpholine N,N'-dicyclohexylcarboxamidinium salts of deoxyguanosine-5'-phosphoromorpholidate, deoxycytidine-5'-phosphoromorpholidate, cytidine-5'-phosphoromorpholidate, thymidine-5'-phosphoromorpholidate and 6-azauridine-5'-phosphoromorpholidate, respectively. In addition, the molarity of the ammonium bicarbonate in the reservoir in the case of Examples II–VI was 0.40 M, 0.35 M, 0.35 M, 0.35 M, and 0.45 M, respectively. The product distributions obtained are shown in the following table.

TABLE I.—PRODUCT DISTRIBUTION
[Percent yields based on starting material]

| Nucleoside | Mono-PO$_4$ | Di-PO$_4$ | Tri-PO$_4$ | Isolated Na salt of Tri-PO$_4$ |
|---|---|---|---|---|
| Deoxyadenosine | 7 | 5 | 82 | 73 |
| Deoxyguanosine | 7 | 6 | 82 | 77 |
| Deoxycytidine | 5 | 7 | 82 | 80 |
| Cytidine | 5 | 7 | 84 | 80 |
| Thymidine | 4 | 9 | 81 | 75 |
| 6-azauridine | 9 | 5 | 82 | 77 |

Examples VII–XII

The procedure employed in Example I was again repeated in every detail except for the following. The 4-morpholine N,N'-dicyclohexylcarboxamidinium salt of deoxyadenosine-5'-phosphoromorpholidate was replaced by equivalent amounts of adenosine-5'-phosphoromorpholidate 4-morpholine N,N'-dicyclohexylcarboxamidinium salt,
adenosine-5'-phosphoropiperidate 4-morpholine N,N'-dicyclohexylcarboxamidinium salt,
adenosine-5'-phosphoropiperidate 1-piperidine N,N'-dicyclohexylcarboxamidinium salt,
uridine-5'-phosphoropiperidate 1-piperidine N,N'-di-(methylcyclohexyl) carboxamidinium salt,
guanosine-5'-phosphoropiperidate 4-morpholine N,N'-dibutylcarboxamidinium salt, and
8-azaguanosine-5'-phosphoromorpholidate 4-morpholine N,N'-dicyclohexylcarboxamidinium salt, respectively. In addition, the dimethylsulfoxide employed was rendered substantially anhydrous by distillation from, and storage for 4 days at room temperature over, Linde Molecular Sieve Type 4A. In each case, a good yield of the corresponding nucleoside-5'-triphosphate, isolated as the lithium salt, was obtained, and in no case did the product show any substantial tendency to degrade to the corresponding lower phosphates.

Examples XIII–XV

The procedure employed in Example I was again repeated in every detail in each of these examples with one exception namely, tetrasodium pyrophosphate·10 H₂O was replaced by equivalent amounts of trisodium orthophosphate·10 H₂O, pentasodium tripolyphosphate and hexasodium tetrapolyphosphate, respectively. The corresponding deoxyadenosine-5′-diphosphate, deoxyadenosine-5′-tetraphosphate and deoxyadenosine-5′-pentaphosphate, respectively, isolated as the sodium salts, were obtained in good yields, and showed substantially no tendency to degrade to the corresponding lower phosphates.

It will be obvious to those skilled in the art that other changes and variations can be made in carrying out the present invention without departing from the spirit and scope thereof as defined in the appended claims.

I claim:
1. A process for the preparation of nucleoside-5′-polyphosphates which comprises reacting, under substantially anhydrous conditions, in a hydrocarbon sulfoxide solvent selected from the group consisting of dialkyl sulfoxide and cycloalkyl sulfoxide:
    (a) A carboxamidinium salt of a nucleoside-5′-phosphoramidate, with
    (b) a tertiary amine salt of an inorganic phosphate containing at least one phosphoryl group.
2. A process according to claim 1 wherein
    (a) said carboxamidinium salt is a N,N′-di-(hydrocarbon substituted) carboxamidinium salt of a nucleoside-5′-phosphoramidate, and
    (b) said tertiary amine salt is a trialkyl amine salt of an inorganic phosphate containing at least one phosphoryl group.
3. A process according to claim 1 wherein said carboxamidinium salt is a 4-morpholine-N,N′-dicyclohexylcarboxamidinium salt of a nucleoside-5′-phosphoromorpholidate, said tertiary amine salt is a trialkyl amine salt of an inorganic phosphate containing from 1 to 4 phosphoryl groups, and said hydrocarbon sulfoxide is dimethyl sulfoxide.
4. A process according to claim 2 wherein the hydrocarbon sulfoxide is dimethyl sulfoxide.
5. A process according to claim 2 wherein said carboxamidinium salt is a N,N′-dicyclohexylcarboxamidinium salt of a nucleoside-5′-phosphoramidate.
6. A process according to claim 2 wherein the nucleoside-5′-phosphoramidate is selected from the group consisting of a nucleoside-5′-phosphormorpholidate and a nucleoside-5′-phosphorpiperidate.
7. A process according to claim 2 wherein said inorganic phosphate contains from 1 to 4 phosphoryl groups, inclusive.
8. A process according to claim 2 wherein said carboxamidinium salt is a N,N′-dicyclohexylcarboxamidinium salt of a nucleoside-5′-phosphomorpholidate, said inorganic phosphate contains from 1 to 4 phosphoryl groups, inclusive and said hydrocarbon sulfoxide is dimethylsulfoxide.
9. A process according to claim 3 wherein said nucleoside-5′-phosphoromorpholidate is adenosine-5′-phosphoromorpholidate and said tertiary amine salt is bis-tri-n-butyl-ammonium pyrophosphate.
10. A process according to claim 3 wherein said nucleoside-5′-phosphoromorpholidate is guanosine-5′-phosphoromorpholidate and said tertiary amine salt is bis-tri-n-butyl-ammonium pyrophosphate.
11. A process according to claim 3 wherein said nucleoside-5′-phosphoromorpholidate is desoxyguanosine-5′-phosphoromorpholidate and said tertiary amine is salt in bis-tri-n-butylammonium pyrophosphate.
12. A process according to claim 3 wherein said nucleoside - 5′-phosphoromorpholidate is 6 - azauridine-5′-phosphoromorpholidate and said tertiary amine is bis-tri-n-butylammonium pyrophosphate.
13. A process according to claim 3 wherein said nucleoside-5′-phosphoromorpholidate is adenosine-5′-phosphoromorpholidate and said tertiary amine salt is tris-n-butylammonium-triphosphate.

References Cited by the Examiner
UNITED STATES PATENTS

| | | | |
|---|---|---|---|
| 3,082,203 | 3/1963 | Goldman et al. | 260—211.5 |
| 3,089,869 | 5/1963 | Mauvernay | 260—211.5 |

LEWIS GOTTS, *Primary Examiner.*

JOHNNIE R. BROWN, *Assistant Examiner.*